US009025240B2

(12) United States Patent
Ogaki

(10) Patent No.: US 9,025,240 B2
(45) Date of Patent: May 5, 2015

(54) LIGHT AMPLIFIER AND LASER PROCESSING DEVICE

(75) Inventor: Tatsuo Ogaki, Kusatsu (JP)

(73) Assignee: Omron Corporation, Kyoto (JP)

( * ) Notice: Subject to any disclaimer, the term of this patent is extended or adjusted under 35 U.S.C. 154(b) by 331 days.

(21) Appl. No.: 13/468,432

(22) Filed: May 10, 2012

(65) Prior Publication Data

US 2012/0300289 A1 Nov. 29, 2012

(30) Foreign Application Priority Data

May 26, 2011 (JP) ................................ 2011-118040

(51) Int. Cl.
| | |
|---|---|
| H04B 10/17 | (2006.01) |
| H01S 3/067 | (2006.01) |
| H01S 3/13 | (2006.01) |
| B23K 26/06 | (2014.01) |
| H01S 3/094 | (2006.01) |
| H01S 3/0941 | (2006.01) |
| H01S 3/10 | (2006.01) |

(52) U.S. Cl.
CPC ......... *H01S 3/06754* (2013.01); *H01S 3/06758* (2013.01); *H01S 3/094076* (2013.01); *H01S 3/09415* (2013.01); *H01S 3/10015* (2013.01); *H01S 3/1301* (2013.01); *H01S 3/1305* (2013.01); *H01S 3/10069* (2013.01); *B23K 26/063* (2013.01)

(58) Field of Classification Search
USPC ................. 372/25, 29.01, 29.014; 359/341.3, 359/341.31
See application file for complete search history.

(56) References Cited

U.S. PATENT DOCUMENTS

| | | | |
|---|---|---|---|
| 5,128,601 | A | 7/1992 | Orbach et al. |
| 5,982,790 | A | 11/1999 | Grossman et al. |
| 7,103,077 | B2 | 9/2006 | Schuhmacher et al. |
| 7,116,688 | B2 | 10/2006 | Sauter et al. |
| 2002/0054231 | A1* | 5/2002 | Masuyuki ..................... 348/362 |

(Continued)

FOREIGN PATENT DOCUMENTS

| | | |
|---|---|---|
| EP | 1447891 | 8/2004 |
| EP | 1591762 | 11/2005 |

(Continued)

OTHER PUBLICATIONS

U.S. Appl. No. 13/468,357 to Tatsuo Ogaki, which was filed on May 10, 2012.
Search report from E.P.O., mail date is Jan. 10, 2014.

*Primary Examiner* — Eric Bolda
(74) *Attorney, Agent, or Firm* — Greenblum & Bernstein, P.L.C.

(57) ABSTRACT

A peak value detector detects power of an output light pulse which is output from the light amplifying fiber. A light receiving element receives a group of light pulses including a plurality of pulses and converts the group of light pulses into a current signal. The current/voltage converter circuit converts the current output from the light receiving element to voltage. The integration circuit integrates the voltage output from the current/voltage converter circuit. A programmable gain amplifier (PGA) amplifies the signal output from the integration circuit and provides the signal for the A/D converter circuit. The gain of the PGA is set by a gain setting signal from the signal processing circuit. The signal processing circuit adjusts the gain of the PGA so that the gain increases as the repetition frequency of the group of pulses increases.

14 Claims, 11 Drawing Sheets

(56) References Cited

U.S. PATENT DOCUMENTS

| | | |
|---|---|---|
| 2004/0012844 A1* | 1/2004 | Ohtsuki et al. ............. 359/341.1 |
| 2004/0160995 A1 | 8/2004 | Sauter et al. |
| 2005/0243877 A1 | 11/2005 | Schuhmacher et al. |
| 2007/0223544 A1* | 9/2007 | Yamazaki et al. ....... 372/29.014 |
| 2010/0183040 A1 | 7/2010 | Ishizu et al. |
| 2010/0303105 A1 | 12/2010 | Zimer et al. |
| 2012/0163402 A1 | 6/2012 | Oba et al. |

FOREIGN PATENT DOCUMENTS

| | | |
|---|---|---|
| JP | 2010-010274 A | 1/2010 |
| JP | 2010-115698 | 5/2010 |
| JP | 2010-171131 A | 8/2010 |
| WO | 2011/004806 | 1/2011 |

* cited by examiner

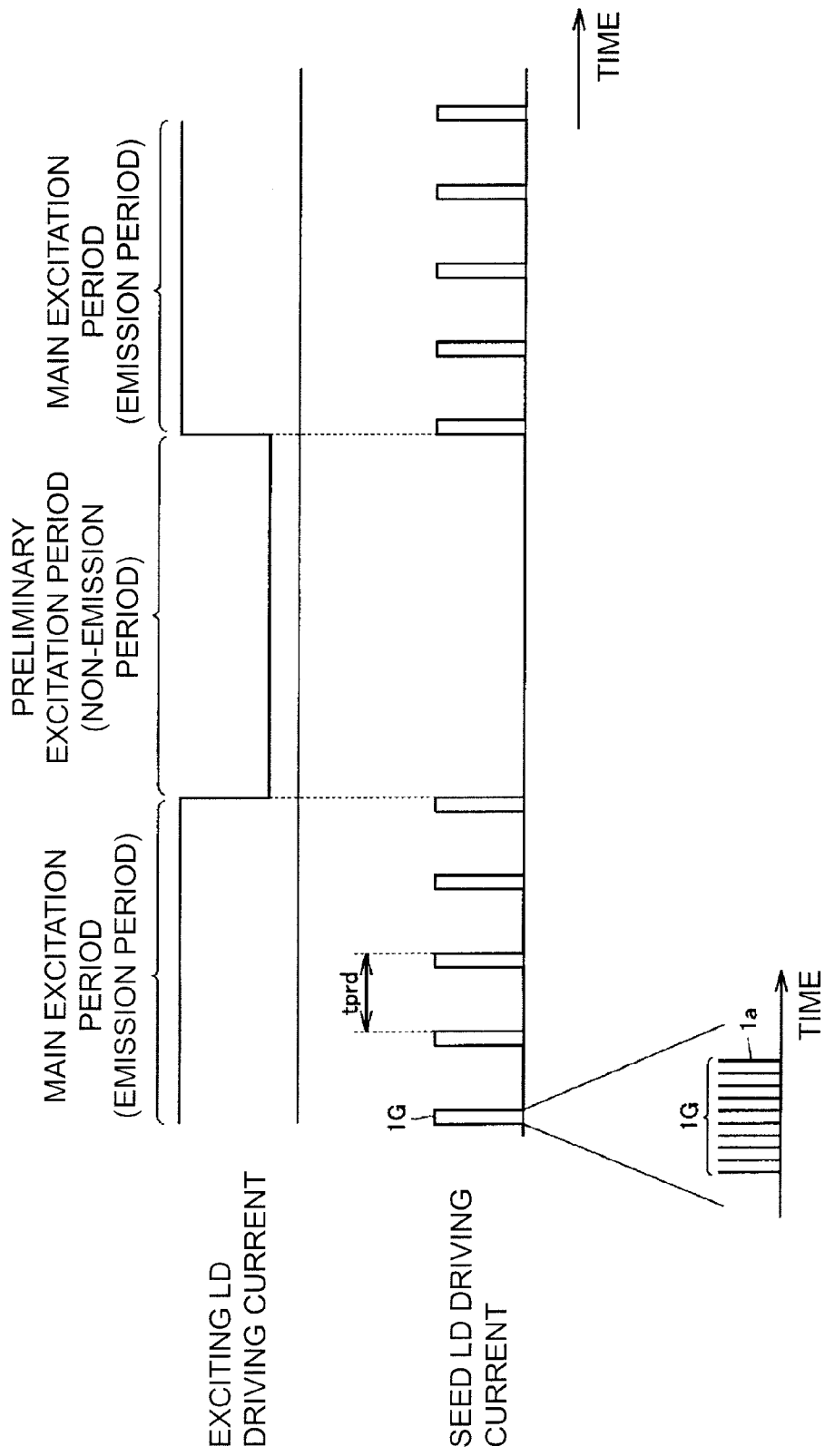

FIG. 7

| THE NUMBER OF PULSES | REPETITION FREQUENCY | | | | |
|---|---|---|---|---|---|
| | F1~F2 | F2~F3 | F3~F4 | ... | Fn-1~Fn |
| 1 | d11 | d12 | d13 | ... | d1n-1 |
| 2 | d21 | d22 | d23 | ... | d2n-1 |
| 3 | d21 | d22 | d23 | ... | d3n-1 |
| .. | .. | .. | .. | ... | d4n-1 |
| m-1 | dm-11 | dm-12 | dm-13 | ... | dm-1n-1 |
| m | dm 1 | dm 2 | dm 3 | ... | dmn-1 |

# LIGHT AMPLIFIER AND LASER PROCESSING DEVICE

CROSS-REFERENCE TO RELATED APPLICATION

This application claims benefit of priority under 35 U.S.C. §119 to Japanese Patent Application No. P2011-118040 filed on May 26, 2011, which is expressly incorporated herein by reference in its entirety.

BACKGROUND

1. Field of the Disclosure

The present disclosure relates to a light amplifier and a laser processing device, and particularly to a technique of stably generating a light pulse from a fiber amplifier in an MOPA (Master Oscillator and Power Amplifier) system.

2. Background Information

In laser processing devices, the laser beam power influences the processing quality. To address the problem, techniques of controlling the power of laser beam emitted from the laser processing device have been proposed.

For example, Japanese Patent Laid-Open No. 2010-10274 discloses configuration for measuring the average power and the peak power of a laser pulse which is output from a fiber laser oscillator and feeding back the measurements to an LD (laser diode) drive circuit.

Further, Japanese-Patent Laid-Open No. 2010-171131, for example, discloses that the laser light source for emitting seed light to be incident on the fiber laser emits pulsed light during a main radiation period and emits substantially continuous light during a preliminary radiation period. The power of the continuous light is weaker than the peak power of the pulsed light.

Japanese-Patent Laid-Open No. 2010-171131 also discloses that the power of the exciting light of the preliminary radiation period is lowered below the power of the exciting light of the main radiation period.

In the method disclosed in Japanese Patent Laid-Open No. 2010-10274, the average power and the peak power of the laser light pulse are measured.

Since the uniformity of the strength of a plurality of pulses cannot be monitored in the method, it is considered to be difficult to control the strength of a plurality of pulses to be uniform by the method. On the other hand, Japanese Patent Laid-Open No. 2010-171131 does not specifically disclose the configuration for detecting the power of the pulse.

Fiber amplifiers are mostly excited by a laser diode (LD). However, in order to change the laser output of the fiber amplifier, the time period after the output of the exciting LD is changed until the laser output is changed (response time) may be about 1 ms or more. Therefore, as the repetition frequency of the pulses is higher, it becomes more difficult to measure the strength of each pulse and feed the measurements back to the control on the pulse strength. For those reasons, in the fiber amplifiers, the measurements of the average power of the laser output are generally fed back to the control on the laser output.

On the other hand, an LD is mostly used for the light source of the seed light to be input to the fiber amplifier. Therefore, the conditions of the seed light pulse can be varied. For example, the repetition frequency can be changed in a wide range or a group of pulses including a plurality of pulses with the pulse width of about ns can be generated.

When the seed light is changed as described above, the variation range of the peak value is greatly widened. Therefore, in the case of fiber amplifier, it is more difficult to detect the peak value for each pulse. On the other hand, it is required to control the strength of a plurality of pulses to be uniform to stabilize the laser output.

An object of the present disclosure is to provide a technique of detecting a peak value for each output light pulse from a light amplifier which uses a light amplifying fiber.

SUMMARY

In accordance with one aspect of the present disclosure, the light amplifier includes a light amplifying fiber for amplifying (that amplifies) seed light by exciting light, a seed light source for generating (that generates) the seed light for a plurality of times during an emission period as a group of pulses including a plurality of pulses, an excitation light source for generating (that generates) the exciting light of power at a first level during a non-emission period which is immediately before the emission period and generating the exciting light of power at a second level which is higher (greater) than (that of) the first level during the emission period, a detector for (that detects) detecting power of a group of output light pulses which is output from the light amplifying fiber, and a control unit (controller) for controlling (that controls) power of the exciting light of the non-emission period based on a detected value from the detector to control the power of the group of output light pulses which is generated during the emission period. The detector includes a light receiving element for receiving (that receives) the group of output light pulses, an integration circuit for integrating (that integrates) an output signal from the light receiving element, and an analog-to-digital (A/D or AD) converter circuit for generating the detected value based on the output signal from the integration circuit.

Preferably, the detector further includes a variable gain amplifier for amplifying (that amplifies) the output signal from the integration circuit to provide the output signal for the A/D converter circuit. The control unit causes the gain of the variable gain amplifier to change according to repetition frequency of the group of pulses to be generated during the emission period.

Preferably, the control unit increases the gain higher as the repetition frequency is higher. That is, the controller increases the gain as the repetition frequency increases.

Preferably, the control unit controls timing for the A/D converter circuit to perform analog-to-digital conversion to cause the A/D converter circuit to perform the analog-to-digital conversion to the peak of the output signal from the variable gain amplifier. The timing is decided based on a delay time from the moment when a first pulse of the plurality of pulses included in the group of pulses is generated.

Preferably, the control unit changes the delay time according to the repetition frequency and the number of the plurality of pulses included in the group of pulses.

In accordance with another aspect of the present disclosure, the laser processing device includes the light amplifier according to any of the above descriptions.

According to the present disclosure, a peak value for each output light pulse of a light amplifier which uses a light amplifying fiber can be detected.

BRIEF DESCRIPTION OF THE DRAWINGS

FIG. 3 is a diagram describing the timing of laser emission shown in FIG. 2 more in detail;

FIG. 7 is a diagram schematically showing a saving form of delay times;

DETAILED DESCRIPTION

Figure 1:
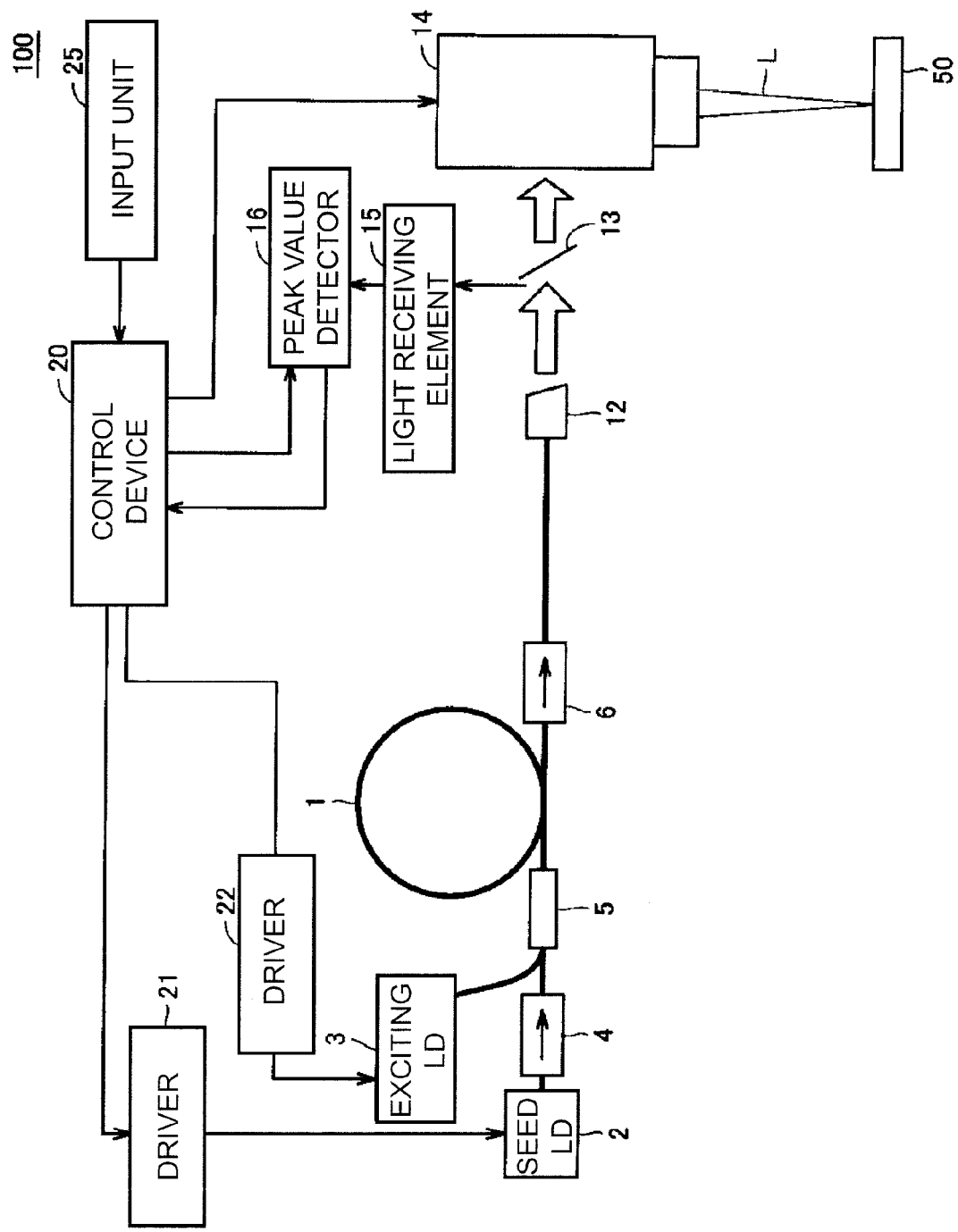
FIG. 1 is a diagram showing an exemplary configuration of a laser processing device according to an embodiment of the present disclosure.

Embodiments of the present disclosure will be described in detail below with reference to the drawings. The same or corresponding parts in the drawings are denoted by the same reference codes and not described repeatedly.

The term "group of pulses" here refers to a plurality of light pulses placed on a time axis at certain time intervals. The group of pulses is called "pulses" here except for the case where a light pulse included in a group of pulses is explicitly meant. The term "LD" here refers to a semiconductor laser.

[Embodiment 1]

FIG. 1 is a diagram showing an exemplary configuration of a laser processing device according to Embodiment 1 of the present disclosure. In FIG. 1, a laser processing device 100 includes a light amplifier and a laser beam scanning mechanism 14 for scanning a laser beam emitted from the light amplifier. The light amplifier includes a light amplifying fiber 1, a seed LD 2, an exciting LD 3, isolators 4 and 6, a combiner 5, an end cap 12, drivers 21 and 22, a light receiving element 15, a peak value detector 16, a control device 20, and an input unit 25.

The light amplifying fiber 1 has a core with a rare-earth element added as a light amplifying component and a clad provided around the core. The type of rare-earth element added to the core is not particularly limited and includes Er (erbium), Yb (ytterbium), and Nd (neodymium), for example. The rare-earth element will be described as Yb below. The light amplifying fiber 1 may be a single clad fiber with a layer of clad provided around the core or a double clad fiber with two layers of clad provided around the core.

The seed LD 2 is a laser light source for emitting seed light. The wavelength of the seed light is selected from the range from 1000 nm to 1100 nm, for example. The driver 21 pulse-drives the seed LD 2 by repeatedly applying a pulsed current to the seed LD 2. That is, pulsed seed light is emitted from the seed LD 2.

The seed light emitted from the seed LD 2 passes through the isolator 4.

The isolator 4 realizes a function of allowing only unidirectional light to transmit and block the light incident in the reverse direction. In the embodiment of the present disclosure, the isolator 4 allows the seed light from the seed LD 2 to transmit while blocking return light from the light amplifying fiber 1. Accordingly, it can prevent the return light from the fiber 1 from entering the seed LD 2. If the return light from the light amplifying fiber 1 enters the seed LD 2, it may damage the seed LD 2, but the present disclosure can prevent the problem by providing the isolator 4.

The exciting LD 3 is excitation light source for emitting exciting light for exciting atoms of the rare-earth element added to the core of the light amplifying fiber 1. If the rare-earth element is Yb, the wavelength of the exciting light is 10 nm plus or minus over 915 nm, for example. The driver 22 drives the exciting LD 3.

The combiner 5 combines the seed light from the seed LD 2 with the exciting light from the exciting LD 3 and have the seed light enter the light amplifying fiber 1.

The light amplifying fiber 1, the seed LD 2, and the exciting LD 3 constitute a fiber amplifier in an MOPA (Master Oscillator and Power Amplifier) system. The exciting light entered in the light amplifying fiber 1 is absorbed by the atoms of the rare-earth element contained in the core and excites the atoms.

When the seed light from the seed LD 2 is propagated through the core of the light amplifying fiber 1, the seed light causes induced emission of the excited atoms, and therefore, the seed light is amplified. That is, the light amplifying fiber 1 amplifies the seed light by the exciting light.

When the light amplifying fiber 1 is a single clad fiber, both the seed light and the exciting light enter the core. On the other hand, when the light amplifying fiber 1 is a double clad fiber, the seed light enters the core and the exciting light enters the first clad. The first clad of the double clad fiber functions as a waveguide for the exciting light. When the exciting light entered in the first clad is propagating through the first clad, the rare-earth element in the core is excited according to the passing mode through the core.

The isolator 6 allows the seed light (light pulse) amplified by the light amplifying fiber 1 and emitted from the light amplifying fiber 1 to pass while blocking the light returning to the light amplifying fiber 1. The light pulse transmitted through the isolator 6 is emitted from the end surface of the optical fiber into the atmosphere.

The end cap 12 is provided to prevent the damage on the boundary surface between the end surface of the optical fiber and the atmosphere, the damage being caused when a light pulse of a high peak power is emitted into the atmosphere.

The beam splitter 13 splits the light pulse output from the end cap 12 into two pulses. One of the pulses is input into the laser beam scanning mechanism 14 as laser light for processing, and the other pulse is input into the light receiving element 15 for monitoring the power of the laser light.

The light receiving element 15 is made of a photodiode, for example.

The peak value detector 16 detects the peak power (peak value) of the light pulse by a signal from the light receiving element 15. The peak value detected by the peak value detector 16 is sent to the control device 20.

The laser beam scanning mechanism 14 is for scanning the laser light in a two dimensional direction. Although not shown, the laser beam scanning mechanism 14 may include a collimator lens for adjusting to a predetermined size the diameter of the laser beam that is output light from the end cap 12, a galvano-scanner for scanning the laser beam passed through the collimator on the surface of the processing object 50 in a two dimensional direction, and a F-theta lens for collecting the laser beam, for example.

When the laser light L, i.e., the output light from the laser processing device 100, is scanned in a two dimensional direction on the surface of the processing object 50, the surface of the processing object 50 made of metal and the like is processed. For example, information including a text, a shape, and the like is printed (marked) on the surface of the processing object 50.

The control device 20 provides integrated control over actions of the laser processing device 100 by controlling the drivers 21 and 22 and the laser beam scanning mechanism 14. The input unit 25 receives information from a user, for example. The control device 20 controls the drivers 21 and 22 while controlling actions of the laser beam scanning mechanism 14 based on the information from the input unit 25.

The control device 20 is implemented by a personal computer which executes a predetermined program, for example. The input unit 25 is not particularly limited and may be any device which allows the user to input information such as a mouse, a keyboard, a touch panel, or the like.

The seed LD 2, the exciting LD 3, the isolator 4 and the like may change in characteristics according to the temperature. Therefore, it is preferable for the laser processing device to include a temperature controller for keeping these devices at a constant temperature.

For outputting the laser light from the laser processing device 100, the seed LD 2 is driven by the driver 21 to generate pulsed seed light. When the seed light is repeatedly generated from the seed LD 2, the repetition frequency of the seed light depends on the repetition frequency of the pulsed current supplied from the driver 21 to the seed LD2. The repetition frequency of the pulsed current output from the driver 21 is controlled by the control device 20.

The control device 20 changes the power of the exciting light emitted from the exciting LD 3 by controlling the driver 22. The exciting LD 3 outputs the exciting light of the power according to the bias current supplied from the driver 22. The strength of the bias current output from the driver 22 is controlled by the control device 20.

Figure 2:
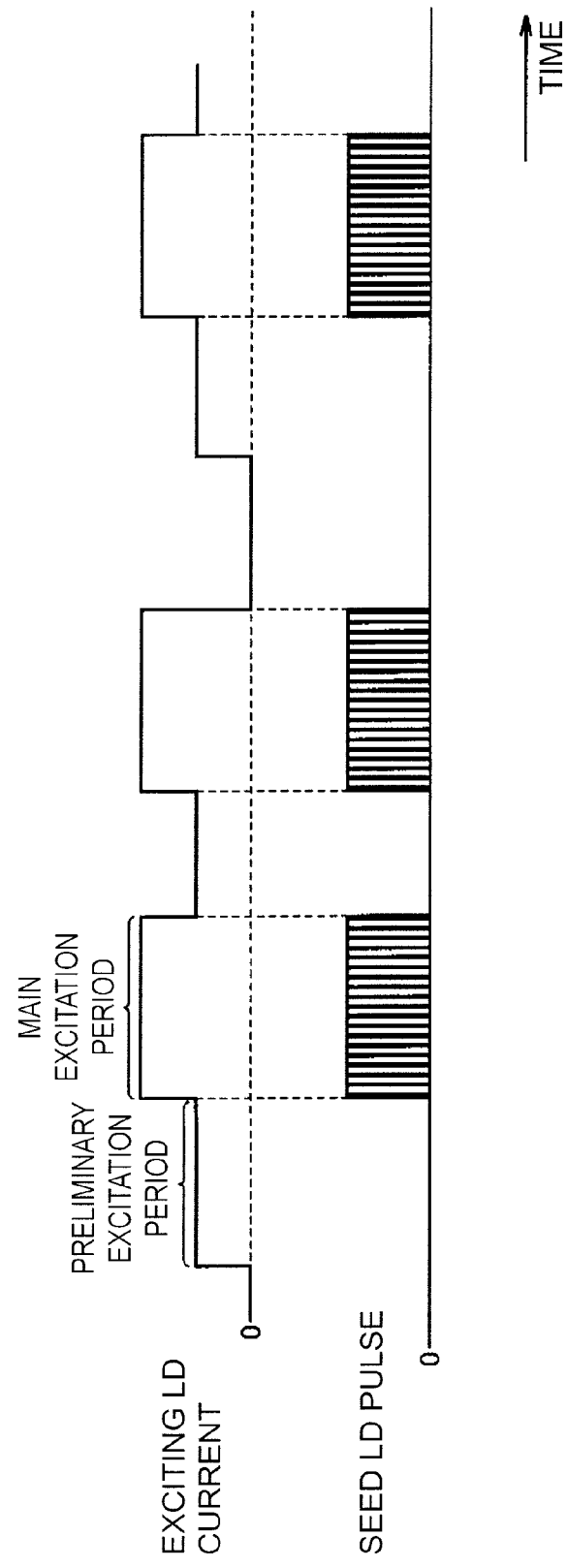
FIG. 2 is a timing diagram of laser emission by the laser processing device according to an embodiment.

FIG. 2 is a timing diagram of laser emission by the laser processing device according to Embodiment 1.

In FIG. 2, during the preliminary excitation period, the driver 22 supplies the bias current (shown as the exciting LD current in FIG. 2) to the exciting LD 3 to generate the exciting light, but the seed LD 2 does not generate the light pulse (shown as the seed LD pulse in FIG. 2). On the other hand, during the main excitation period, both the exciting light and the seed LD pulse are generated.

Therefore, the laser light is output from the fiber amplifier during the main excitation period.

The exciting LD current during the preliminary excitation period is lower than the exciting LD current during the main excitation period.

That is, the exciting LD 3 generates the exciting light of the power at a first level during the preliminary excitation period and generates the exciting light of the power at a second level during the main excitation period. The second level is higher than the first level.

FIG. 3 is a diagram describing the timing of laser emission shown in FIG. 2 more in detail. In FIG. 3, the seed LD 2 repeatedly generates a group of pulses 1G including a plurality of seed light pulses 1a on a cycle tprd during the main excitation period. When the bias current of the seed LD 2 is modulated, the group of pulses 1G is generated on the predetermined cycle. The main excitation period corresponds to the emission period in which the laser light is output from the fiber amplifier. On the other hand, since the bias current is not supplied to the seed LD 2 during the preliminary excitation period, the preliminary excitation period is the non-emission period.

Among a plurality of groups of pulses output from the fiber amplifier during the main excitation period, the first output group of pulses is called the "first pulses" and the final output group of pulses is called the "final pulses" below.

Figure 4A:
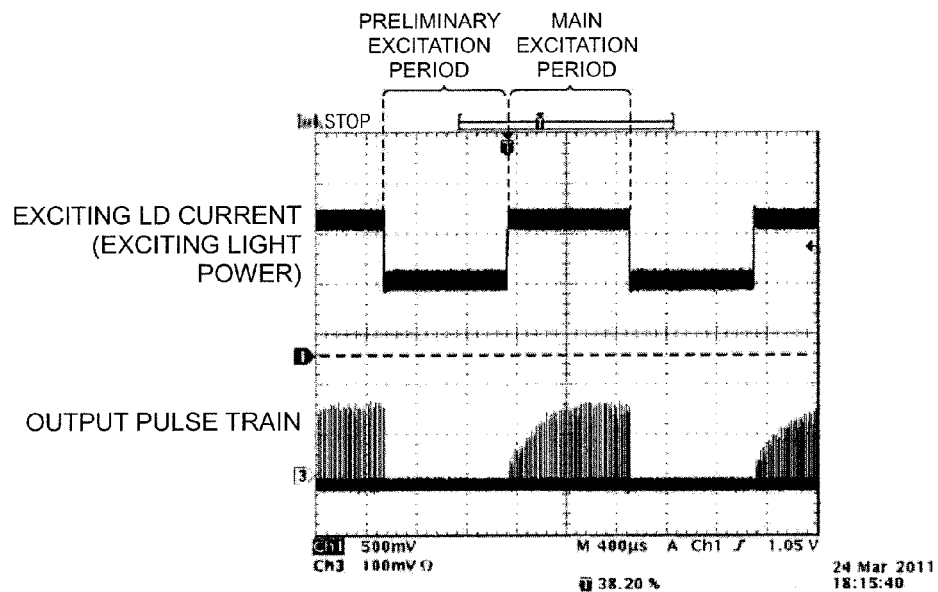
FIGS. 4A and 4B are waveform charts describing that the power of first pulses changes depending on the exciting light power in a preliminary excitation period.
Figure 4B:
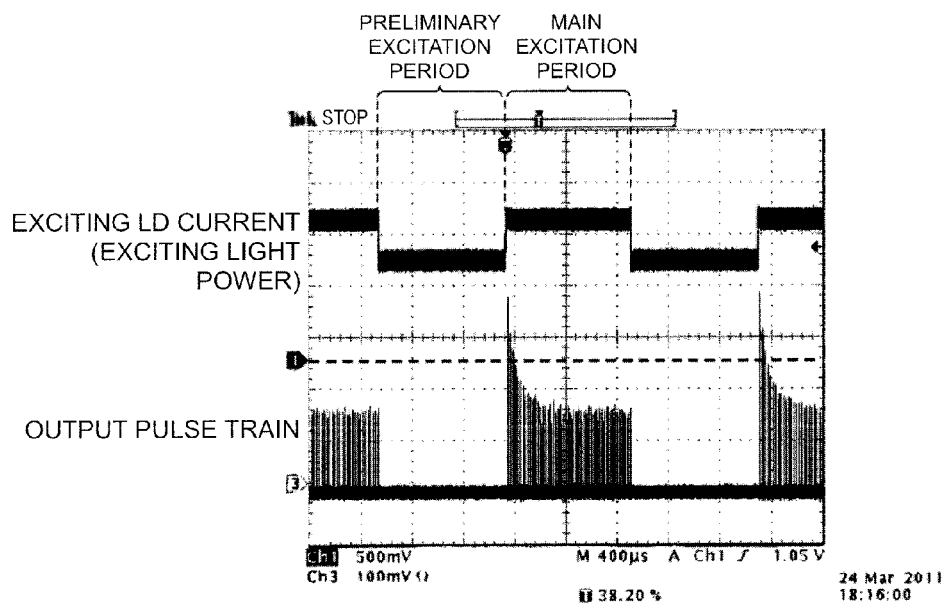

FIGS. 4A and 4B are waveform charts describing that the power of the first pulses changes depending on the exciting light power of the preliminary excitation period. FIG. 4A is a waveform chart showing the pulse output from the fiber amplifier when the exciting light power of the preliminary excitation period is low. FIG. 4B is a waveform chart showing the pulse output from the fiber amplifier when the exciting light power of the preliminary excitation period is high. In FIGS. 4A and 4B, since the exciting light power is low when the exciting LD current is low during the preliminary excitation period, a little energy is accumulated in the light amplifying fiber 1 during the preliminary excitation period. Therefore, the power of the first pulses is low. While the supplement of the exciting light power to the light amplifying fiber 1 and the emission of the light energy from the light amplifying fiber 1 are repeated, the energy accumulated in the light amplifying fiber 1 is increased to reach a substantially certain level. Accordingly, the power of the pulses is stabilized.

Conversely, when the exciting LD current during the preliminary excitation period is high, large energy is accumulated in the light fiber during the preliminary excitation period. Therefore, the power of the first pulses is high.

In that case, while the supplement of the exciting light power to the light amplifying fiber 1 and the emission of the light energy from the light amplifying fiber 1 are repeated, the energy accumulated in the light amplifying fiber 1 is decreased to reach a substantially certain level. Accordingly, the power of the pulses is stabilized.

As shown in FIG. 4, when the power of the exciting light during the preliminary excitation period (exciting LD current) is not optimal, the power of the first pulses is different from the power of the pulses after a certain period of time.

Such a difference between the powers causes the problem of degraded processing quality.

Figure 5:
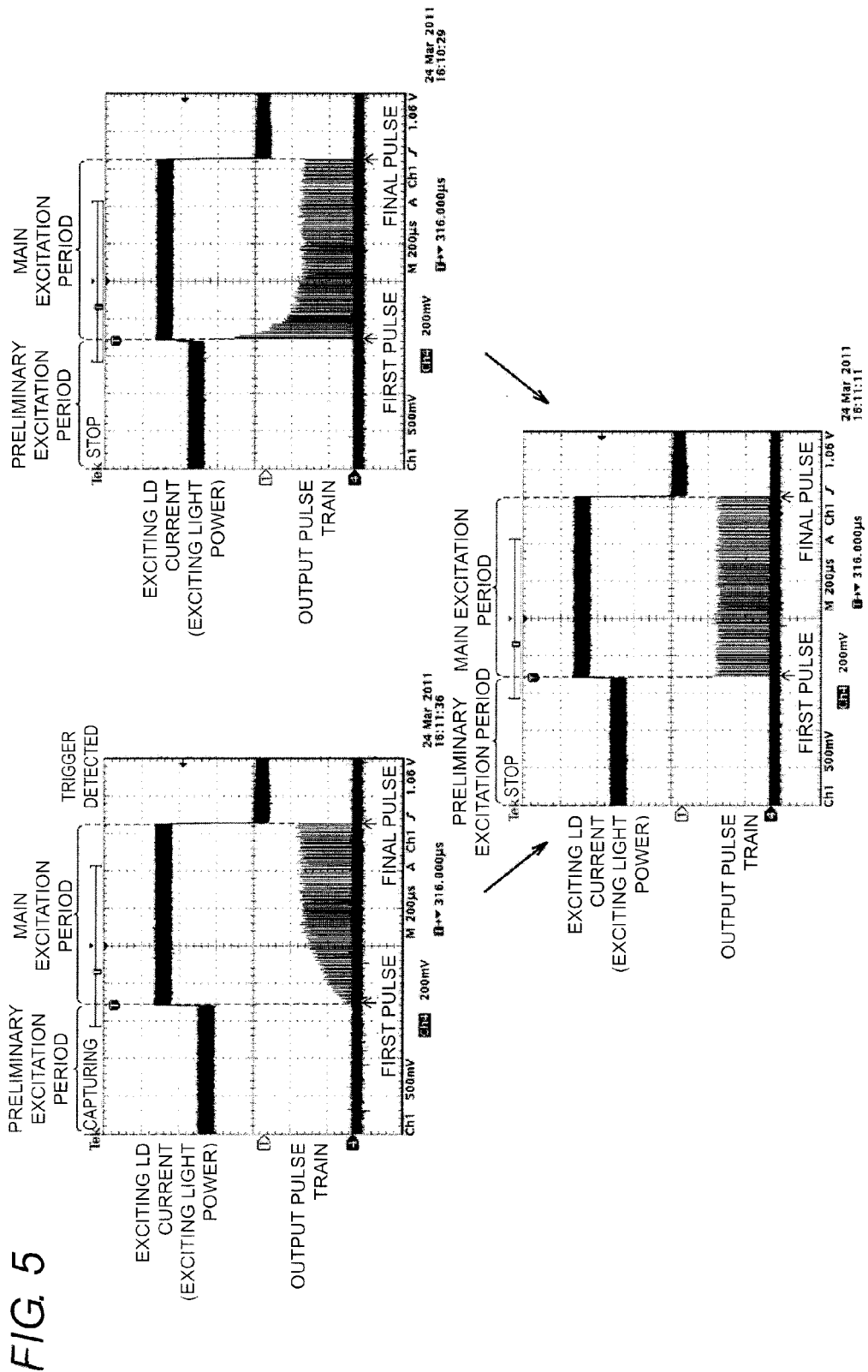
FIG. 5 is a waveform chart describing a theory of stabilizing the power of pulses according to an embodiment.

FIG. 5 is a waveform chart describing a theory of stabilizing the power of pulses according to Embodiment 1.

With reference to FIG. 5, the peak power of the first pulses is compared with the peak power of the final pulses in Embodiment 1. The compared result is fed back to the bias current value of the exciting LD 3 of the preliminary excitation period to bring the difference between the power of the first pulses and the power of the final pulses close to zero. Accordingly, the stabilized laser output can be realized from the first pulses. As shown in FIG. 1, the peak power of the pulses is detected by the light receiving element 15 and the peak value detector 16.

Figure 6:
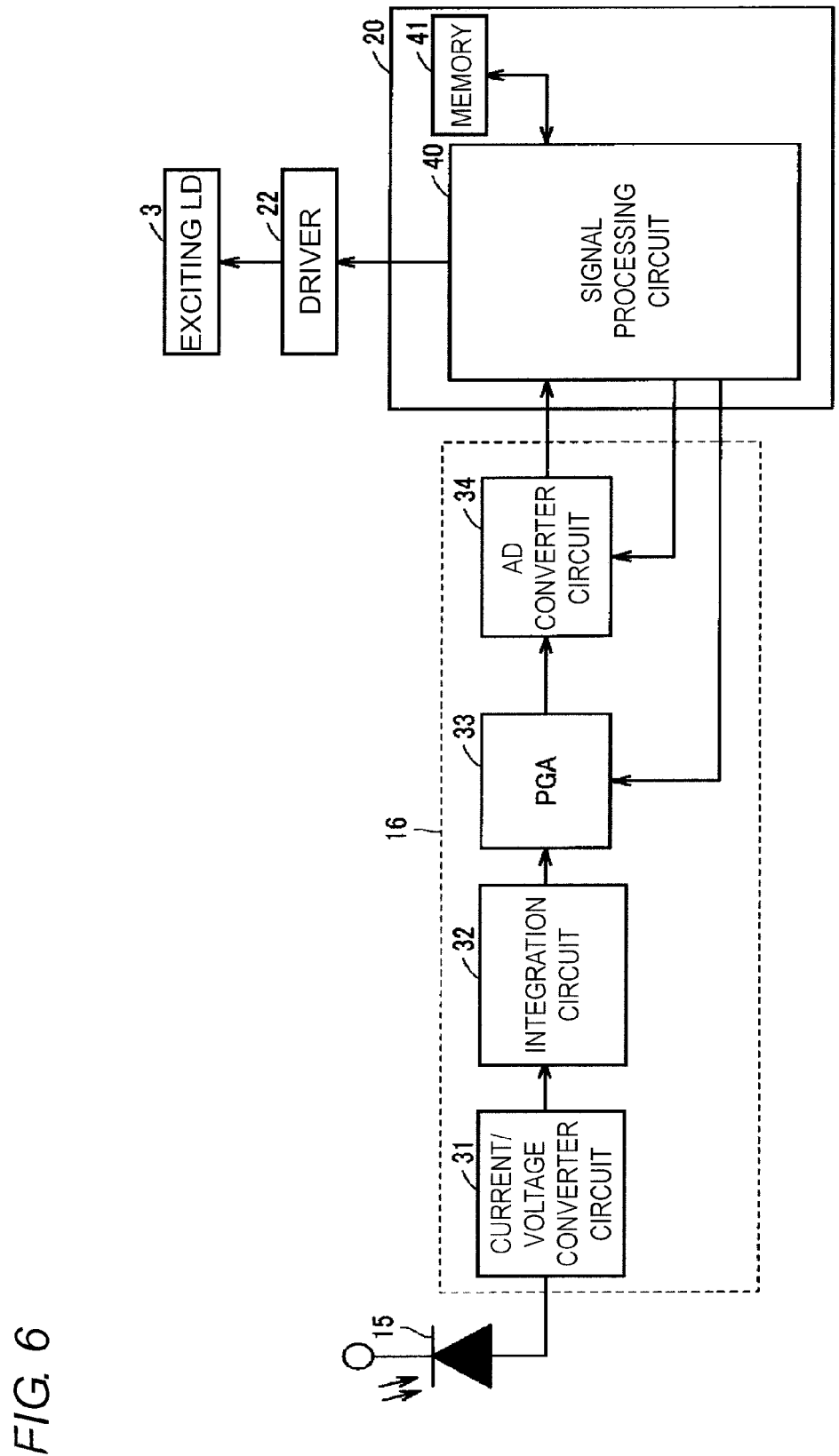
FIG. 6 is a block diagram showing an exemplary specific configuration for detecting a peak power of the pulses.

FIG. 6 is a block diagram showing an exemplary specific configuration for detecting a peak power of the pulses. In FIG. 6, the peak value detector 16 includes a current/voltage converter circuit 31, an integration circuit 32, a PGA (Programmable Gain Amplifier) 33, and an AD converter circuit 34. The control device 20 includes a signal processing circuit 40 and a memory 41.

The light receiving element 15 receives a light pulse and converts the light pulse into a current signal. The current/voltage converter circuit 31 converts the current output from the light receiving element 15 to voltage. The integration circuit 32 integrates the voltage output from the current/voltage converter circuit 31.

As shown in FIG. 3, a group of pulses including a plurality of short pulses (for example, the order of duration of ns) is generated in the embodiment. The integration circuit 32 integrates the waveform of the plurality of short pulses by a predetermined time constant. Consequently, the change in amplitude depending on the number of the short pulses included in the group of pulses can be reduced and the peak power (amplitude) of a single group of pulses can be obtained.

The peak value of the group of pulses changes according to the number of pulses included in the group of pulses. Accordingly, the variation range of the peak value is greatly widened. As an example, assuming that the range of the repetition frequency is two digits (one to hundred times) and the number of pulses included in a group of pulses can be varied from 1 to 20. In that case, the peak value of a group of pulses changes as much as by thousand times.

Therefore, it is difficult to detect the peak value for each pulse.

When the exciting power is the same, the integrated value of the energy of the group of pulses is almost the same regardless of the number of pulses.

In Embodiment 1, the pulses included in the group of pulses are averaged by the integration circuit 32 by taking advantage of the feature.

Accordingly, the amplitude of the electric signal output from the integration circuit 32 can be made almost the same without regard to the number of pulses included in the group of pulses. Since the change of amplitude depending on the number of the short pulses included in the group of pulses can be reduced by the integration circuit 32, the peak power (amplitude) of a single group of pulses can be obtained.

The PGA 33 amplifies the signal output from the integration circuit 32.

The PGA 33 is a variable gain amplifier and the gain of the PGA 33 is set by a gain setting signal from the signal processing circuit 40.

Since the peak power (amplitude) in a single group of pulses decreases as the repetition frequency increases, the signal processing circuit 40 adjusts the gain of the PGA 33 so that the gain increases as the repetition frequency increases. The gain of the PGA 33 is set to limit the amplitude of the signal input to the AD converter circuit 34 within the dynamic range of the AD converter circuit 34.

The AD converter circuit 34 is implemented by a high-speed AD converter circuit, for example, and converts an analog signal output from the PGA 33 into a digital signal. The timing of the AD conversion by the AD converter circuit 34 is controlled by a control signal from the signal processing circuit 40. Specifically, the signal from the PGA 33 is AD-converted after a predetermined delay time has passed from the starting of the seed light emission (the emission of the first pulse of a plurality of pulses included in a group of pulses). The delay time is decided so that the AD converter circuit 34 performs the AD conversion at the peak of the power of the group of pulses.

Consequently, the peak power of the group of pulses, i.e., the peak value, is obtained as the detected value. The peak value (digital signal) obtained by the AD converter circuit 34 is sent from the AD converter circuit 34 to the signal processing circuit 40.

The signal processing circuit 40 compares the peak values of the first pulses with the final pulses. When the peak value of the first pulses is higher than the peak value of the final pulses, the signal processing circuit 40 generates a signal for decreasing the bias current value of the exciting LD 3 in the preliminary excitation period and sends the signal to the driver 22 during the preliminary excitation period. Conversely, when the peak value of the first pulses is lower than the peak value of the final pulses, the signal processing circuit 40 generates a signal for increasing the bias current value of the exciting LD 3 in the preliminary excitation period and sends the signal to the driver 22 during the preliminary excitation period. In response to the signal from the signal processing circuit 40, the driver 22 decreases or increases the bias current value of the exciting LD 3 in the preliminary excitation period.

Accordingly, the power of the exciting light from the exciting LD 3 is changed.

The memory 41 is implemented by a nonvolatile memory, for example, and previously saves information on timing of the AD conversion to be performed by the AD converter circuit 34, i.e., the above described delay time.

FIG. 7 is a diagram schematically showing a saving form of delay times.

In FIG. 7, the delay time is saved in the memory 41 in a table format.

Specifically, an optimal value is determined for a combination of the range of repetition frequency of a group of pulses (for example, 100 kHz to 120 kHz) and the number of pulses included in a single group of pulses. The format of saving the delay time is not limited to the table format and may be stored in the memory 41 in a database format, for example.

Now, detection of the pulse peak value which is performed based on the circuitry shown in FIG. 6 will be described further in detail.

Figure 8:
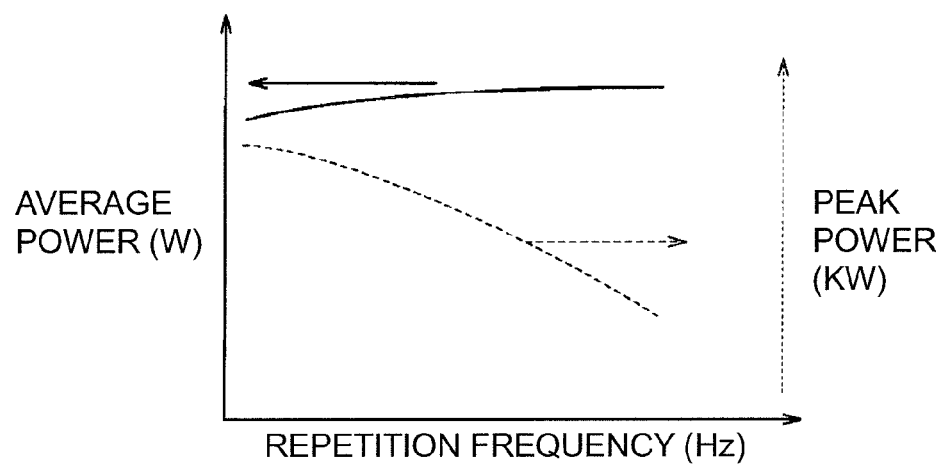
FIG. 8 is a diagram showing relationship of repetition frequency of a group of pulses versus an average power of the group of pulses and the peak power of the group of pulses.

FIG. 8 is a diagram showing relationship of repetition frequency of a group of pulses versus an average power of the group of pulses and the peak power of the group of pulses. In FIG. 8, when the power of the exciting light is constant, the peak power of the pulses decreases as the repetition frequency increases. On the other hand, the average power is kept almost constant with respect to the repetition frequency. When the average power is the same, the peak power of the pulses is inversely proportional to the repetition frequency.

Figure 9:
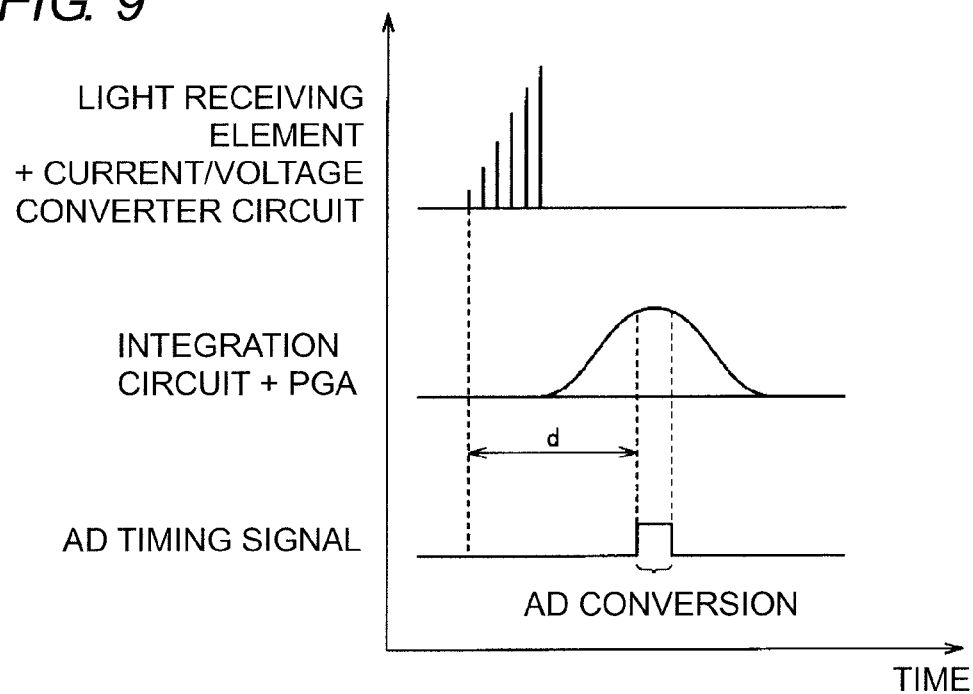
FIG. 9 is a diagram for describing timing of AD conversion performed by an AD converter circuit.

FIG. 9 is a diagram for describing timing of AD conversion performed by the AD converter circuit. In FIGS. 6 and 9, electric signals including a plurality of pulses are output through the light receiving element 15 and the current/voltage converter circuit 31. The integration circuit 32 integrates the plurality of pulses.

The output signal from the integration circuit 32 is amplified by the PGA 33.

After a predetermined delay time d has passed from the first pulse emission, an AD timing signal is sent to the AD converter circuit 34. The delay time d is decided so that the AD converter circuit 34 performs the AD conversion near the peak of the signal from the PGA 33. Consequently, the peak power value of a group of pulses can be obtained.

In FIG. 9, the envelope of the plurality of pulses is shaped in a continuously increasing triangle. However, the envelope of the plurality of pulses is not limited to that and may be in any other shape. For example, the strength of all the plurality of pulses may be the same. It is advantageous that the variation of peak among a plurality of pulses can be reduced not by the shape of the envelope but by the integration circuit.

Figure 10A:
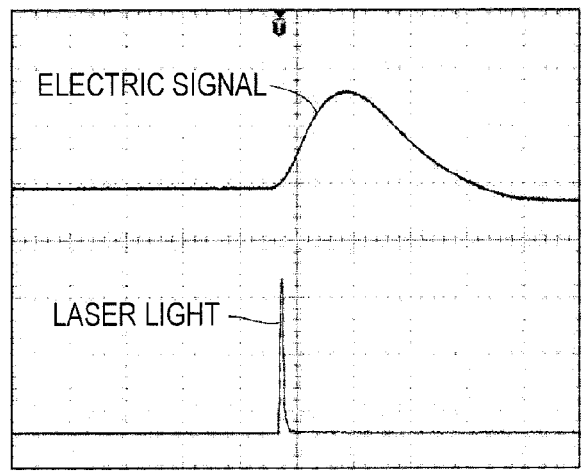
FIGS. 10A, 10B, and 10C are diagrams showing detailed examples of waveform shown in FIG. 9.
Figure 10B:
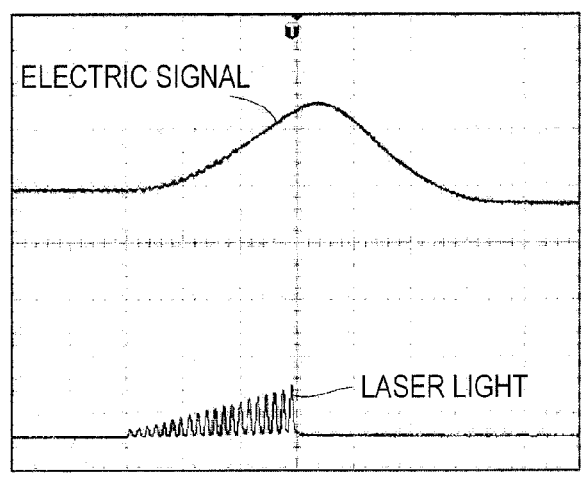
Figure 10C:
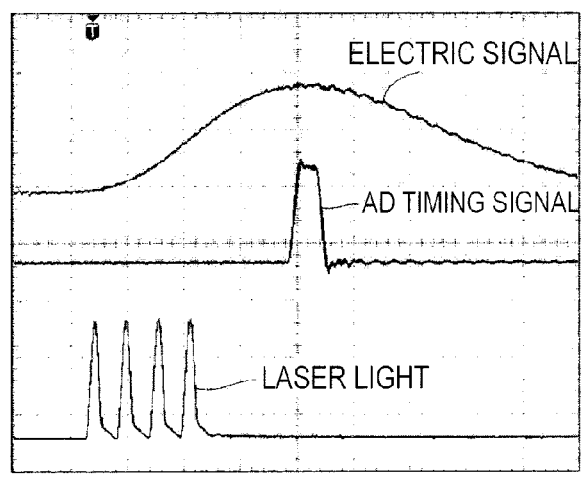

FIGS. 10A, 10B, and 10C are diagrams showing specific examples of the waveform shown in FIG. 9. FIG. 10A is a diagram showing a waveform of a laser pulse when the number of pulses included in a group of pulses is 1 and a waveform of an electric signal after the integration. FIG. 10B is a diagram showing a waveform of a laser pulse when the number of pulses included in a group of pulses is 20 and a waveform of an electric signal after the integration FIG. 10C is a waveform diagram for describing timing of AD conversion performed on the signal waveform after the integration and amplification.

In FIGS. 10A and 10B, the peak values of the laser pulse waveforms are evaluated by the voltage range and the ratio of the peak value of the laser light waveform shown in FIG. 10A and the peak value of the laser light waveform shown in FIG. 10B is about 5:2. That is, the peak value of the laser pulse waveform shown in FIG. 10A is about 2.5 times (according to the evaluation made by voltage range) the peak value of the laser pulse waveform shown in FIG. 10B. That corresponds to the fact that the peak value of the laser pulse shown in FIG. 10A is about 7 times the peak value of the laser pulse shown in FIG. 10B.

On the other hand, as for the electric signal after the integration, the electric signal shown in FIG. 10A and the electric signal shown in FIG. 10B have almost the same peak value.

In FIG. 10C, the AD conversion timing signal is generated by delaying a predetermined time period from the first pulse light included in the group of pulses (the pulse light may be seed light or an output pulse). Accordingly, the electric signal processed in the integration circuit and the PGA can be detected.

Since integration of the electric signal widens the pulse width of the signal, it is further advantageous in that the proportion of the variation of the AD conversion value to the variation of the AD timing signal in terms of time decreases.

Figure 11:
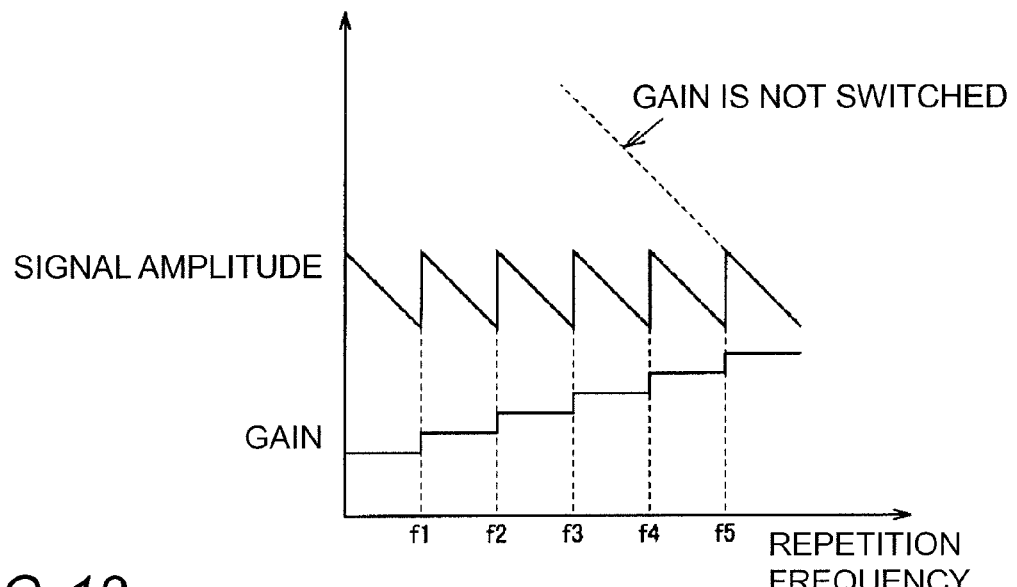
FIG. 11 is a diagram showing relationship between an amplitude of a signal which is input to an AD converter circuit 34 and a gain of a PGA 33.

FIG. 11 is a diagram showing the relationship between the amplitude of a signal which is input to an AD converter circuit 34 and the gain of the PGA 33.

In FIG. 11, the gain of the PGA 33 increases stepwise as the repetition frequency increases. The frequencies f1 to f5 indicate the repetition frequencies when the gain is switched. That change of gain is achieved by a gain setting signal sent from the signal processing circuit 40 to the PGA 33.

As shown in FIG. 8, the peak power decreases as the repetition frequency increases. When the gain is not switched (for example, when the gain is fixed to the maximum), the amplitude of the input signal to the AD converter circuit 34 increases as the repetition frequency decreases. Therefore, the amplitude of the input signal to the AD converter circuit 34 can exceed the dynamic range of the AD converter circuit 34. The gain may be changed as shown in FIG. 11 to suppress the level of the signal amplitude not more than the dynamic range of the AD converter circuit 34. Therefore, the peak value of the signal can be detected.

Figure 12:
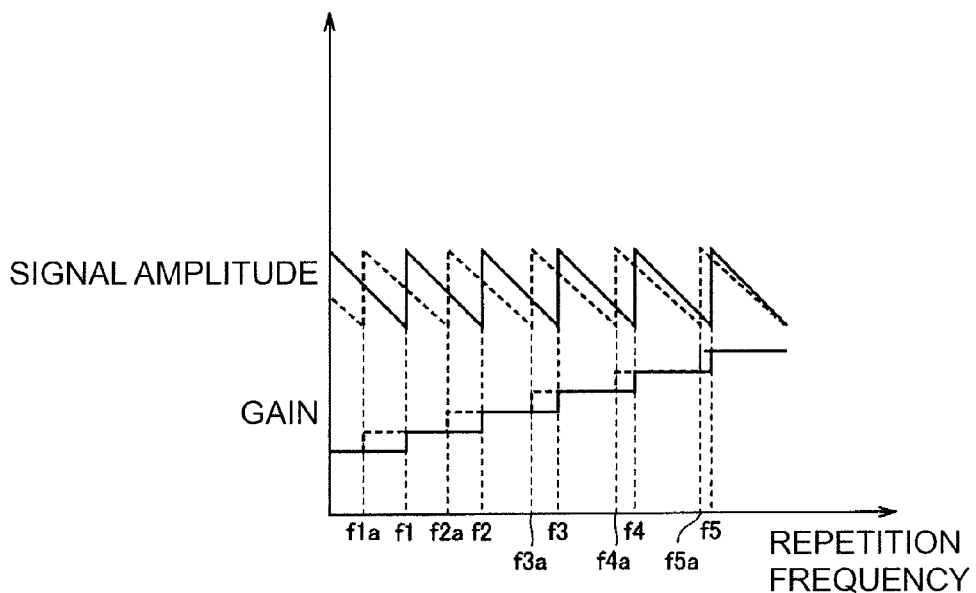
FIG. 12 is a diagram showing another example of gain setting in the PGA 33.

FIG. 12 is a diagram showing another example of gain setting in the PGA 33. In FIG. 12, when the amplitude of the input signal to the AD converter circuit 34 is at a standard level, the gain switching frequencies are f1, f2, f3, f4, and f5.

On the other hand, when the amplitude of the input signal is higher than the standard level, the gain switching frequencies are f1$a$, f2$a$, f3$a$, f4$a$, and f5$a$.

As such, the gain switching frequency may be individually set according to the level of amplitude of the input signal. Consequently, the variation of the gain of the PGA can be absorbed.

As described above, according to Embodiment 1, the light amplifier includes a light receiving element 15 for receiving the group of output light pulses from the light amplifying fiber 1, an integration circuit 32 for integrating an output signal from the light receiving element 15, and an AD converter circuit 34 for generating the detected value based on the output signal from the integration circuit 32. The variation of peak among a plurality of pulses can be reduced by the integration circuit 32. Accordingly, the power of the group of output light pulses which includes short pulses (for example, the signal of the pulse width of ns) can be detected.

Further, according to Embodiment 1, the light amplifier further includes a variable gain amplifier (PGA 33) for amplifying the output signal from the integration circuit 32 to provide the output signal for the AD converter circuit 34.

The signal processing circuit 40 causes the gain of the PGA 33 to change according to the repetition frequency of the group of pulses to be generated during the emission period. Accordingly, the power of the group of output light pulses can be detected even when the repetition frequency changes widely.

Therefore, according to Embodiment 1, the peak value can be detected for each group of output light pulses. Accordingly, the control device 20 can control the power of the exciting light of the non-emission period (preliminary excitation period) by using the detected peak value. Therefore, according to Embodiment 1, the laser processing device which uses the fiber amplifier can make the peak value of the laser pulse uniform.

[Embodiment 2]

Figure 13:
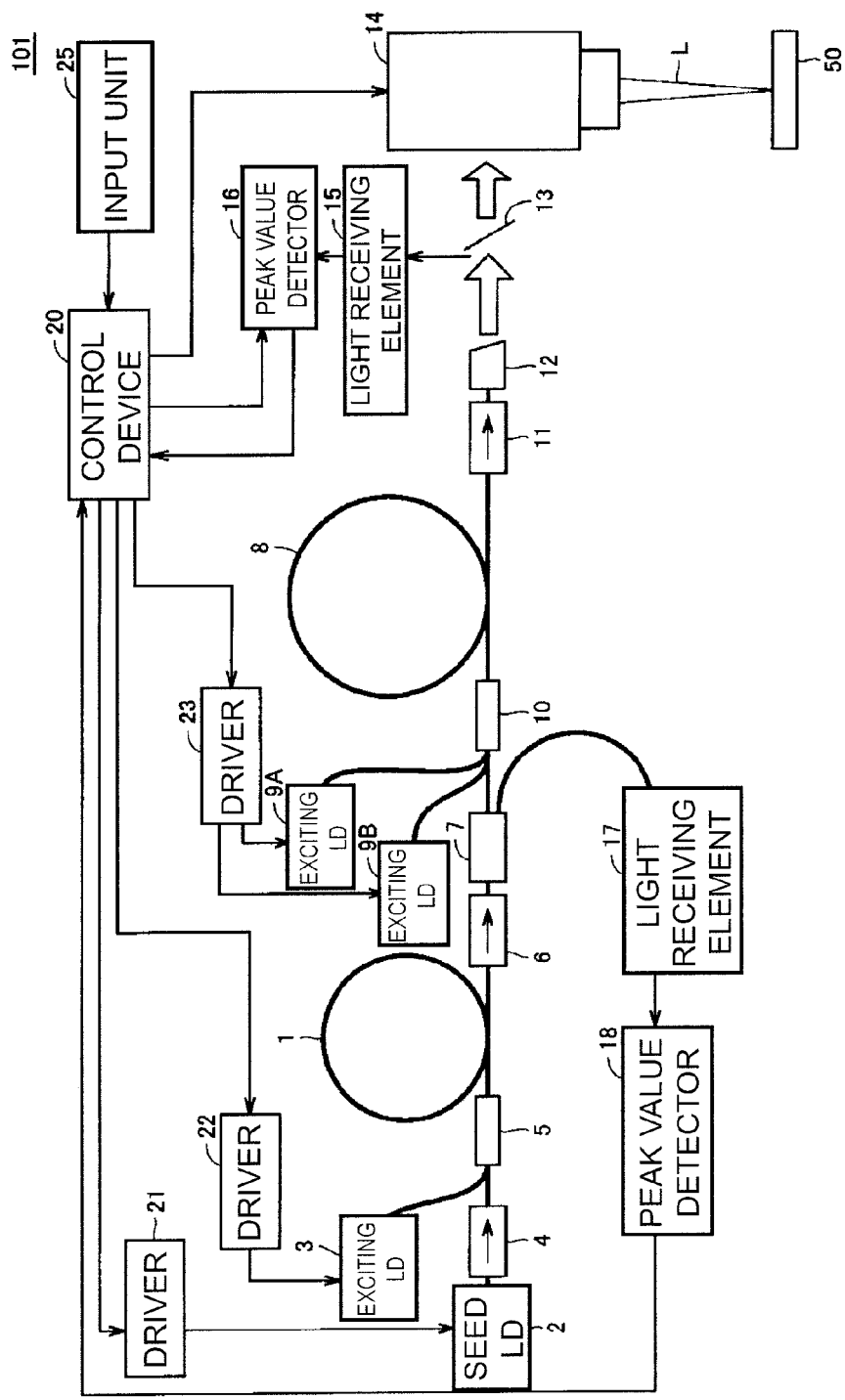
FIG. 13 is a configuration diagram of the laser processing device according to another embodiment.

FIG. 13 is a configuration diagram of the laser processing device according to Embodiment 2. In FIG. 13, a laser processing device 101 includes a light amplifier constituted of a two stage fiber amplifier. In that point, the laser processing device according to Embodiment 2 is different from the laser processing device according to Embodiment 1. In FIGS. 1 and 13, the laser processing device 101 is different from the laser processing device 100 in further including a coupler 7, a light amplifying fiber 8, exciting LDs 9A and 9B, a combiner 10, an isolator 11, a light receiving element 17, a peak value detector 18, and a driver 23.

The coupler 7 divides the light pulse output via the isolator 6 from the light amplifying fiber 1 into the light pulse to be sent to the combiner 10 and the light pulse to be sent to the light receiving element 17. The combiner 10 combines the laser light from the coupler 7 with the laser light from the exciting LDs 9A and 9B, and has them enter the light amplifying fiber 8.

The exciting LDs 9A and 9B are driven by the driver 23. The driver 23 is controlled by the control device 20. The light amplifying fiber 8 amplifies the laser light from the coupler 7 by the laser lights from the exciting LDs 9A and 9B.

That is, the laser light from the coupler 7 is the seed light and the laser lights from the exciting LDs 9A, 9B are exciting lights. The power of the exciting lights emitted from the exciting LDs 9A and 9B decreases in the preliminary excitation period and increases in the main excitation period.

The isolator 11 allows the laser light output from the light amplifying fiber 8 to pass while blocking the laser light returning to the light amplifying fiber 8.

The light receiving element 17 receives the light pulse from the coupler 7 and outputs a signal indicating the strength of the light pulse. The peak value detector 18 detects the peak value of the light pulse by the signal from the light receiving element 17. The peak value detected by the peak value detector 18 is sent to the control device 20.

The configuration of the light receiving element 17 and the peak value detector 18 is the same as the configuration of the light receiving element 15 and the peak value detector 16. Therefore, the control device 20 obtains the power value of the group of output light pulses which is emitted from the light amplifying fiber 1 from the peak value detector 18 in the same manner as that in Embodiment 1. Similarly, the control device 20 obtains the power value of the group of output light pulses which is emitted from the light amplifying fiber 8 from the peak value detector 16 in the same manner as that in Embodiment 1. Since the configuration of the other components of the laser processing device 101 is the same as the configuration of the corresponding components of the laser processing device 100, it is not described again below.

According to Embodiment 2, the control device 20 controls the driver 22 based on the peak value of the pulses detected by the light receiving element 17 and the peak value detector 18. Accordingly, the pulse emitted from the light amplifying fiber 1 can be controlled to make the peak values of the first pulses and the final pulses of the group of pulses emitted from the light amplifying fiber 1 the same. Further, the control device 20 controls the driver 23 based on the peak value of the pulses detected by the light receiving element 15 and the peak value detector 16.

Accordingly, the pulse emitted from the light amplifying fiber 8 can be controlled to make the peak values of the first pulses and the final pulses of the plurality of pulses emitted from the final amplifying stage, i.e., the light amplifying fiber 8, the same. Since the controlling method according to Embodiment 1 can be applied to the method for controlling the pulse emitted from the light amplifying fiber 8, it is not described again in detail below.

According to Embodiment 2, the power of the group of output light pulses can be detected as in Embodiment 1. Therefore, according to Embodiment 2, the stabilized laser pulse output can be obtained from the final amplifying stage even if a plurality of the amplifying stages are used. The number of the amplifying stages is not limited to two and may be any number such as three or more.

Also, the number of the exciting LDs provided for each amplifying stage is not limited to those shown in FIGS. 1 and 13, and any number of exciting LDs may be set.

Further, although the term "repetition frequency" means the repetition frequency of the seed light pulse in the above described embodiments, it may be the repetition frequency of the output light pulse which is output from the light amplifying fiber. With either meaning, the gain of the PGA is set higher as the repetition frequency of the pulse to be generated during the emission period (the output light pulse from the seed light pulse or the light amplifying fiber) is higher in the above described embodiments.

Further, although the laser processing device has been disclosed as a using form of the light amplifier in the above described embodiments, the use of the light amplifier according to the embodiments of the present disclosure is not limited to the laser processing device.

It should be construed that the embodiments disclosed here are not for limiting but for exemplifying the present disclosure in all aspects. The scope of the present disclosure is defined not by the above description but by the appended claims and all modifications within the equivalent meaning and scope of the appended claims are intended to be included in the disclosure.

What is claimed is:

1. A light amplifier comprising:
a light amplifying fiber that amplifies seed light by exciting light;
a seed light source that generates the seed light a plurality of times during an emission period as a group of pulses including a plurality of pulses;
an excitation light source that generates the exciting light of a power at a first level during a non-emission period which is immediately before the emission period and generates the exciting light of a power at a second level which is greater than that of the first level during the emission period;
a detector that detects power of a group of output light pulses which is output from the light amplifying fiber; and
a controller that controls the power of the exciting light of the non-emission period based on a detected value from the detector to control the power of the group of output light pulses, wherein
the detector comprises a light receiving element that receives the group of output light pulses,
an integration circuit that integrates an output signal from the light receiving element, and
an analog-to-digital (A/D) converter circuit that generates the detected value based on the output signal from the integration circuit.

2. The light amplifier according to claim 1, wherein the detector further comprises a variable gain amplifier that amplifies the output signal from the integration circuit to provide the output signal for the A/D converter circuit, and the controller causes the gain of the variable gain amplifier to change according to repetition frequency of the group of pulses to be generated during the emission period.

3. The light amplifier according to claim 2, wherein the controller increases the gain as the repetition frequency increases.

4. The light amplifier according to claim 2, wherein the controller controls timing for the A/D converter circuit to perform analog-to-digital conversion to cause the A/D converter circuit to perform the analog-to-digital conversion to the peak of the output signal from the variable gain amplifier, and the timing is decided based on a delay time from the moment when a first pulse of the plurality of pulses included in the group of pulses is generated.

5. The light amplifier according to claim 4, wherein the controller changes the delay time according to the repetition frequency and the number of the plurality of pulses included in the group of pulses.

6. The light amplifier according to claim 3, wherein the controller controls timing for the A/D converter circuit to perform analog-to-digital conversion to cause the A/D converter circuit to perform the analog-to-digital conversion to the peak of the output signal from the variable gain amplifier, and the timing is decided based on a delay time from the moment when a first pulse of the plurality of pulses included in the group of pulses is generated.

7. The light amplifier according to claim 6, wherein the controller changes the delay time according to the repetition frequency and the number of the plurality of pulses included in the group of pulses.

8. A laser processing device comprising the light amplifier according to claim 1.

9. A laser processing device comprising the light amplifier according to claim 2.

10. A laser processing device comprising the light amplifier according to claim 3.

11. A laser processing device comprising the light amplifier according to claim 4.

12. A laser processing device comprising the light amplifier according to claim 5.

13. A laser processing device comprising the light amplifier according to claim 6.

14. A laser processing device comprising the light amplifier according to claim 7.

* * * * *